United States Patent
Scoffone et al.

(10) Patent No.: US 10,132,195 B2
(45) Date of Patent: *Nov. 20, 2018

(54) WHEEL SPACE PURGE FLOW MIXING CHAMBER

(71) Applicant: General Electric Company, Schenectady, NY (US)

(72) Inventors: Matthew Peter Scoffone, Greenville, SC (US); Jason Edward Albert, Greenville, SC (US); Michael Robert Berry, Simpsonville, SC (US); Mitchell Allan Merrill, Taylor, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/918,005

(22) Filed: Oct. 20, 2015

(65) Prior Publication Data

US 2017/0107853 A1   Apr. 20, 2017

(51) Int. Cl.
*F01D 25/14* (2006.01)
*F01D 9/02* (2006.01)
(Continued)

(52) U.S. Cl.
CPC .............. *F01D 25/14* (2013.01); *F01D 9/02* (2013.01); *F01D 25/12* (2013.01); *F02C 7/18* (2013.01);
(Continued)

(58) Field of Classification Search
CPC ... F01D 9/02; F01D 9/06; F01D 5/189; F01D 25/08; F01D 25/12; F01D 25/14;
(Continued)

(56) References Cited

U.S. PATENT DOCUMENTS 3,275,294 A   9/1966   Allen et al.
4,666,368 A   5/1987   Hook, Jr. et al.
(Continued)

FOREIGN PATENT DOCUMENTS

DE   1210254 B   2/1966
EP   0636765 B1   10/1996
(Continued)

OTHER PUBLICATIONS

European Search Report and Opinion, European Application No. 16194092.9, dated Feb. 28, 2017, 7 pages.
(Continued)

*Primary Examiner* — Logan Kraft
*Assistant Examiner* — John S Hunter
(74) *Attorney, Agent, or Firm* — Ernest G. Cusick; Hoffman Warnick LLC

(57) ABSTRACT

Cooling air extracted from a gas turbine engine compressor is sent to nozzle vane cooling passage inlets, through the cooling passages, and to purge tubes of a set of two or more vanes. A mixing chamber formed between the purge tubes in a diaphragm cavity receives fluid from the purge tubes and directs it through exit passage(s) formed through a wall of the mixing chamber to a surface of the diaphragm. The exit passage(s) can be inclined to induce a fluid velocity component substantially parallel to the surface and/or in a rotation direction of a turbine wheel.

13 Claims, 5 Drawing Sheets

(51) Int. Cl.
  *F02C 7/18* (2006.01)
  *F01D 25/12* (2006.01)
(52) U.S. Cl.
  CPC .... *F05D 2240/10* (2013.01); *F05D 2240/128* (2013.01); *F05D 2260/202* (2013.01); *F05D 2260/232* (2013.01); *Y02T 50/676* (2013.01)
(58) Field of Classification Search
  CPC .......... F05D 2260/20; F05D 2260/232; F05D 2240/128; F02C 7/18
  See application file for complete search history.

(56) References Cited

U.S. PATENT DOCUMENTS

| | | |
|---|---|---|
| 4,930,980 A | 6/1990 | North et al. |
| 5,352,087 A | 10/1994 | Antonellis |
| 5,358,374 A | 10/1994 | Correia et al. |
| 5,488,825 A | 2/1996 | Davis et al. |
| 5,591,002 A | 1/1997 | Cunha et al. |
| 5,749,701 A | 5/1998 | Clarke et al. |
| 6,065,928 A | 5/2000 | Rieck, Jr. et al. |
| 6,077,034 A | 6/2000 | Tomita et al. |
| 6,398,485 B1 | 6/2002 | Frosini et al. |
| 6,769,865 B2 * | 8/2004 | Kress ........ F01D 9/04 415/113 |
| 8,079,803 B2 | 12/2011 | Takamura et al. |
| 8,562,285 B2 | 10/2013 | McCaffrey et al. |
| 2003/0180147 A1 | 9/2003 | Bolms et al. |
| 2011/0070077 A1 | 3/2011 | Steiger et al. |
| 2011/0162387 A1* | 7/2011 | Chir ........ F01D 5/081 60/806 |
| 2011/0189000 A1 | 8/2011 | Vedhagiri et al. |
| 2013/0004295 A1 | 1/2013 | Naryzhny et al. |
| 2013/0280040 A1 | 10/2013 | Johns et al. |

FOREIGN PATENT DOCUMENTS

| | | |
|---|---|---|
| EP | 0919700 A1 | 6/1999 |
| EP | 0940562 A2 | 9/1999 |
| EP | 2503101 A2 | 9/2012 |
| FR | 1351268 A | 1/1964 |
| GB | 960817 A * | 6/1964 ........... F24F 3/0522 |

OTHER PUBLICATIONS

Office Action for U.S. Appl. No. 14/887,988, dated Oct. 19, 2017, 45 pages.

* cited by examiner

WHEEL SPACE PURGE FLOW MIXING CHAMBER

The present application relates generally to a cooling system on a turbomachine, and more particularly to a system for regulating a cooling fluid within a wheelspace area of a turbomachine.

Some turbomachines, such as hot gas turbine engines, can employ one or more combustion chambers in which the combustion of a fuel air mixture generates a supply of hot gas. The hot gas, which can also be called a work fluid, is directed from the combustion chamber through a work fluid path to one or more turbine wheels where the hot gas is caused to flow between turbine buckets or blades which are mounted in a peripheral row on each turbine wheel. These buckets or blades react to the impinging hot gas or work fluid to convert energy in the gas, such as kinetic energy, to rotational movement of the turbine wheels. In some cases, the turbine wheels are mounted on a common shaft with an air compressor and the rotating turbine wheels then also drive the compressor, which can supply air for fuel combustion in the engines. Because the engine utilizes a large supply of very hot gases flowing therethrough, a number of components and engine structures which are exposed to the hot gas are caused to reach very high temperatures. In some cases, the temperatures of these parts and components reach a level where they are potentially structurally detrimental. In such cases, cooling the parts can reduce or avoid damage.

To cool such parts in some turbomachines, a portion of the air compressed by the compressor can be diverted from combustion to cool various stationary and rotating components or to purge cavities within a gas turbine. Cooling air can be taken from the compressor and utilized to cool the noted components and structures. The diverted airflow (hereinafter "cooling fluid,") can consume a considerable amount of the total airflow compressed by the compressor. The diverted cooling fluid is not used in combustion, reducing the performance of the gas turbine. Regulating and controlling the cooling fluid can dramatically increase the performance of the turbine. Typically, the cooling fluid is extracted from the compressor, bypasses the combustion system, and flows through a cooling circuit. The cooling circuit is typically located near various turbine components including the rotor compressor-turbine joint (hereinafter "marriage joint"), and various wheelspace areas. The configuration of the cooling circuit can affect the adequacy of cooling fluid flow rate and/or volume to the aforementioned turbine components. The cooling circuit can include a chamber, such as a plenum, that can direct cooling fluid to a specific wheelspace area, taking into account the significant volume of coolant air that can be utilized, and its ultimate disposal within the engine in an advantageous manner.

SUMMARY

In an embodiment of the present invention, a turbomachine cooling circuit can include at least two purge tubes at radially inner ends of respective vanes of a stationary component of a turbomachine. The vanes can be disposed in a work fluid flow path of the turbomachine, and each purge tube can include an exit of a respective cooling passage of the respective vane. A mixing chamber in fluid communication with each of the at least two purge tubes can be formed in a radially outer portion of a diaphragm of the stationary component, the diaphragm being located substantially out of the work fluid flow path. The mixing chamber can have a plurality of mixing chamber walls that can include circumferentially spaced apart mixing chamber end walls, a mixing chamber top wall radially spaced apart from a mixing chamber bottom wall, and opposed forward and aft mixing chamber side walls. The cooling circuit can further include at least one exit passage formed through one of the mixing chamber walls and a corresponding portion of the diaphragm such that cooling fluid entering the mixing chamber from the at least two purge tubes flows into the mixing chamber and exits through the at least one exit passage to a surface of the diaphragm.

In an alternate embodiment of the present invention, a turbomachine cooling system can include a cooling fluid extraction port in a compressor section of a turbomachine and through which cooling fluid selectively flows from the compressor section. A cooling fluid conduit can be in fluid communication with the extraction port and a respective cooling passage inlet of each of at least two vanes of a stationary component in a turbine section of the turbomachine, the at least two vanes being mounted with radially inner ends thereof substantially adjacent an outer periphery of a diaphragm of the stationary component. A cavity can be formed in the outer periphery of the diaphragm and can include a cavity inner wall extending in a substantially circumferential direction of the diaphragm, as well as opposed forward and aft cavity side walls extending substantially radially away from the cavity inner wall. A respective purge tube at the radially inner end of each vane can be in fluid communication with the respective cooling passage. A mixing chamber can be formed in the cavity and can be in fluid communication with the purge tubes of the at least two vanes, and can also include opposed mixing chamber end walls, a mixing chamber top wall radially spaced apart from a mixing chamber bottom wall, and opposed forward and aft mixing chamber side walls. At least one exit passage can extend through one of the mixing chamber walls and through a corresponding one of the cavity walls such that cooling fluid entering the mixing chamber from the purge tubes flows into the mixing chamber and exits through the at least one exit passage to a surface of the diaphragm.

In a further embodiment of the present invention, turbomachine can include a compressor section and a turbine section. The compressor section can include a cooling fluid extraction port through which cooling fluid selectively flows from the compressor section, and the turbine section can include a plurality of stationary components and a plurality of rotating components. At least one stationary component can include a diaphragm having a cavity formed in an outer portion thereof, the cavity having a substantially circumferential cavity inner wall and opposed forward and aft cavity side walls extending substantially radially away from the cavity inner wall. The stationary component can also include a plurality of vanes extending radially away from the diaphragm, and each rotating component can include a turbine wheel. The turbomachine can further include a cooling fluid circuit in fluid communication with the extraction port and can also have a cooling passage of each vane extending from a cooling passage inlet in fluid communication with the extraction port to a cooling passage exit at a radially inner end of the respective vane. A purge tube of each vane at a radially inner end thereof and in fluid communication with the cooling passage exit can also be part of the cooling fluid circuit, as can a mixing chamber formed in the cavity in fluid communication with at least a pair of the vanes, the mixing chamber including circumferentially spaced apart mixing chamber end walls, a mixing chamber top wall radially spaced apart from a mixing chamber bottom wall, and opposed forward and aft mixing chamber side walls. Additionally, the cooling circuit can have respective connectors extending from each purge tube of the at least a pair of vanes to an end wall of the mixing chamber, each connector providing fluid communication between the respective purge tube and the mixing chamber through the end wall, and at least one exit passage formed through one of the mixing chamber walls and the corresponding cavity wall inclined relative thereto such that cooling fluid entering the mixing chamber from the purge tube flows into the mixing chamber and exits through the at least one exit passage at a surface of the diaphragm with a velocity component substantially parallel to a surface of the diaphragm.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings.

Figure 1:
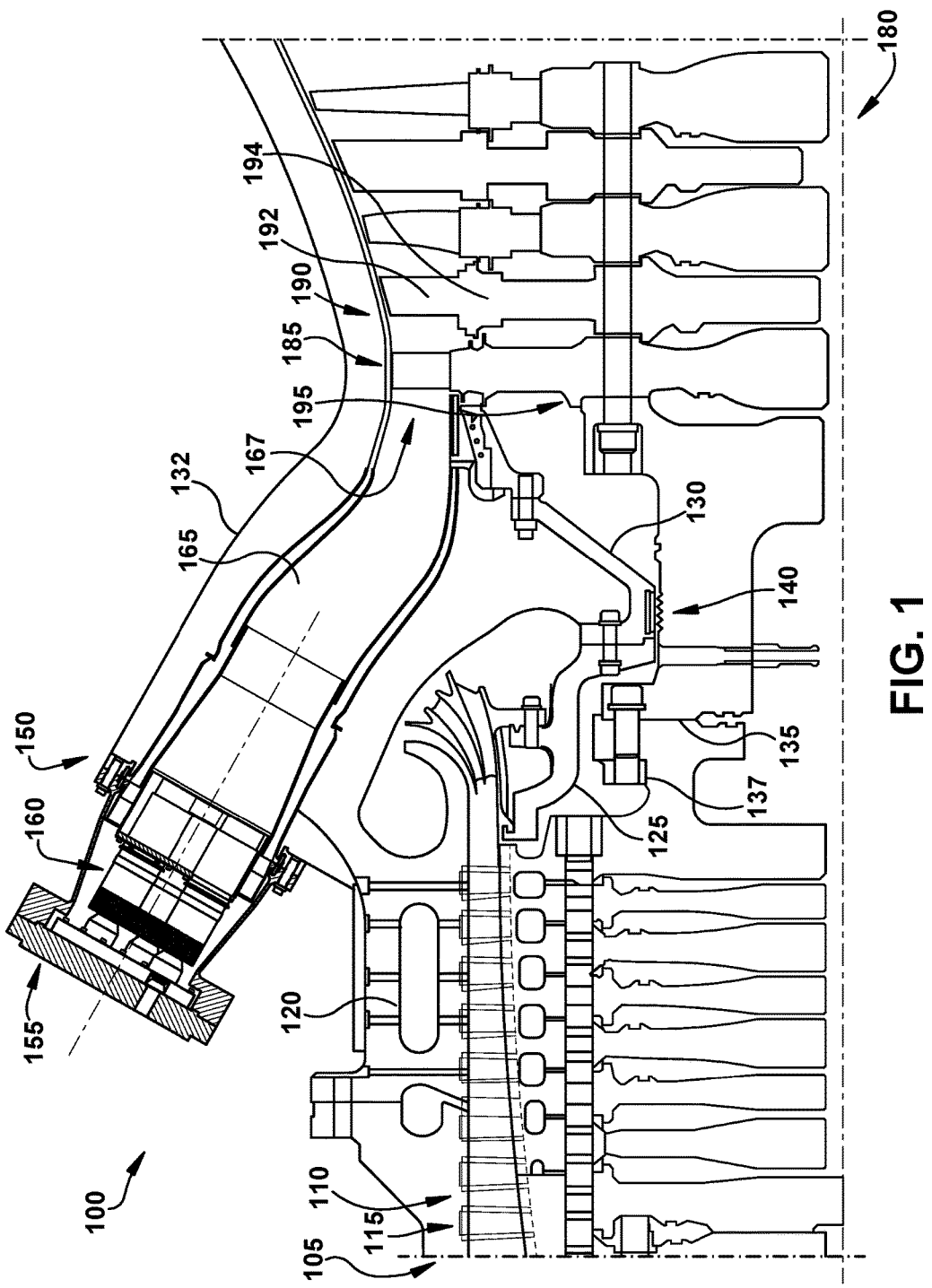
FIG. 1 is a schematic view, in cross-section, of a turbomachine, here a gas turbine, illustrating the environment in which an embodiment of the present invention as disclosed herein can operate.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-5, like numbering may represent like elements. Redundant explanation of these elements has been omitted for clarity. Finally, it is understood that the components of FIGS. 1-9 and their accompanying descriptions may be applied to any embodiment described herein.

DETAILED DESCRIPTION

Broadly, embodiments of the invention disclosed herein enable cooling fluid regulation in a more compact gas turbine engine that provides four stages within the space previously used to provide three stages. Axial space is thus limited with this engine, and a system to deliver cooling fluid, such as compressor-derived purge flow, to a forward wheelspace have 25% less available space than the systems of previous engines. Embodiments of the invention disclosed herein address this by providing a mixing chamber formed in the diaphragm and connected to a purge tube from a vane to receive cooling fluid, such as purge flow from a compressor of the engine, and at least one exit passage through a side wall of the mixing chamber, through the diaphragm to a surface of the diaphragm, and thus to a wheelspace adjacent the diaphragm, to maintain heat transfer flow properties in the reduced available space. In particular, forming exit passage(s) in a forward wall of the mixing chamber and diaphragm can result in improved performance, and inclining the exit passage to induce a velocity component substantially parallel to the diametral surface of the diaphragm can further enhanced performance, particularly when the velocity component is in a substantially circumferential direction of the diaphragm and/or tangential to a direction of rotation of a turbine wheel adjacent the exit passage and/or diaphragm.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a," "an" and "the" are intended to include the plural forms as well, unless the context clearly indicates otherwise. The terms "comprises," "comprising," "can include" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" can include any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "forward," "aft" and the like merely describe the configuration shown in the FIGS. Indeed, the element or elements of an embodiment of the present invention may be oriented in any direction and the terminology, therefore, should be understood as encompassing such variations unless specified otherwise.

The present invention may be applied to a variety of air-ingesting turbomachines. This can include, but is not limited to, heavy-duty gas turbines, aero-derivatives, and the like. Although the following discussion relates to the gas turbine illustrated in FIG. 1, embodiments of the present invention can be applied to a gas turbine with a different configuration. For example, but not limiting of, the present invention can apply to a gas turbine with different, or additional, components than those illustrated in FIG. 1.

Referring now to the FIGS., where the various numbers represent like components throughout the several views, FIG. 1 is a schematic view, in cross-section, of a portion of a gas turbine engine, illustrating an environment in which an embodiment of the present invention can operate. In FIG. 1, a turbomachine, such as a gas turbine 100, can include a compressor section 105, a combustion section 150, and a turbine section 180.

Generally, compressor section 105 can include a plurality of rotating blades 110 and stationary vanes 115 structured to compress a fluid. Compressor section 105 can also include an extraction port 120, an inner barrel 125, a compressor discharge casing 130, a marriage joint 135, a marriage joint bolt 137, and seal system components 140. Compressor discharge casing 130 can include an additional portion 132 that can extend at least around a portion of combustion section 150 and/or a portion of turbine section 180 and can assist in bypass flow of cooling fluid extracted from compressor section 105 as will be described.

Combustion section 150 can generally include a plurality of combustion cans 155, a plurality of fuel nozzles 160, and a plurality of transition sections 165. Fuel nozzles 160 can be coupled to a fuel source so as to deliver fuel to combustion cans 155. Combustion cans 155 can each receive compressed air from compressor section 105 that can be mixed with fuel received from the fuel source via fuel nozzles 160. The air and fuel mixture can be ignited to create a working fluid that can generally proceed from the aft end of fuel nozzles 160 downstream through transition section 165 into a work fluid path 167 extending through turbine section 180.

Turbine section 180 can include a plurality of rotating components 185, a plurality of stationary components 190, which can include nozzle vanes 192 disposed in work fluid path 167 and diaphragms 194 disposed substantially out of work fluid path 167, and a plurality of wheelspace areas 195. Turbine section 180 can convert the working fluid to a mechanical torque by extracting kinetic energy from the working fluid with rotating and stationary components 185, 190. It should be understood that diaphragms 194 can be substantially annular and/or substantially cylindrical, and can include a plurality of arcuate segments 300 (FIG. 3) connected to form the diaphragms. In embodiments, a plurality of vanes 192 can be mounted and radially spaced apart around a diaphragm 194. In addition, embodiments can mount vanes 192 on and/or in diaphragms 194.

Typically, during operation of gas turbine 100, a plurality of components can experience high temperatures and can require cooling or purging. These components can include a portion of compressor section 105, marriage joint 135, and wheelspace areas 195.

Extraction port 120 can draw cooling fluid, such as air, from compressor section 105. Cooling fluid can bypass combustion section 150 to flow through a cooling circuit 200 (illustrated in FIG. 2) to cool or purge various components including parts of rotating and stationary components 185, 190, and wheelspace areas 195. In embodiments, bypassed cooling fluid can travel through additional portion 132 of compressor discharge casing 130 so as to provide cooling fluid to outer ends of components 185 of turbine section 180.

Figure 2:
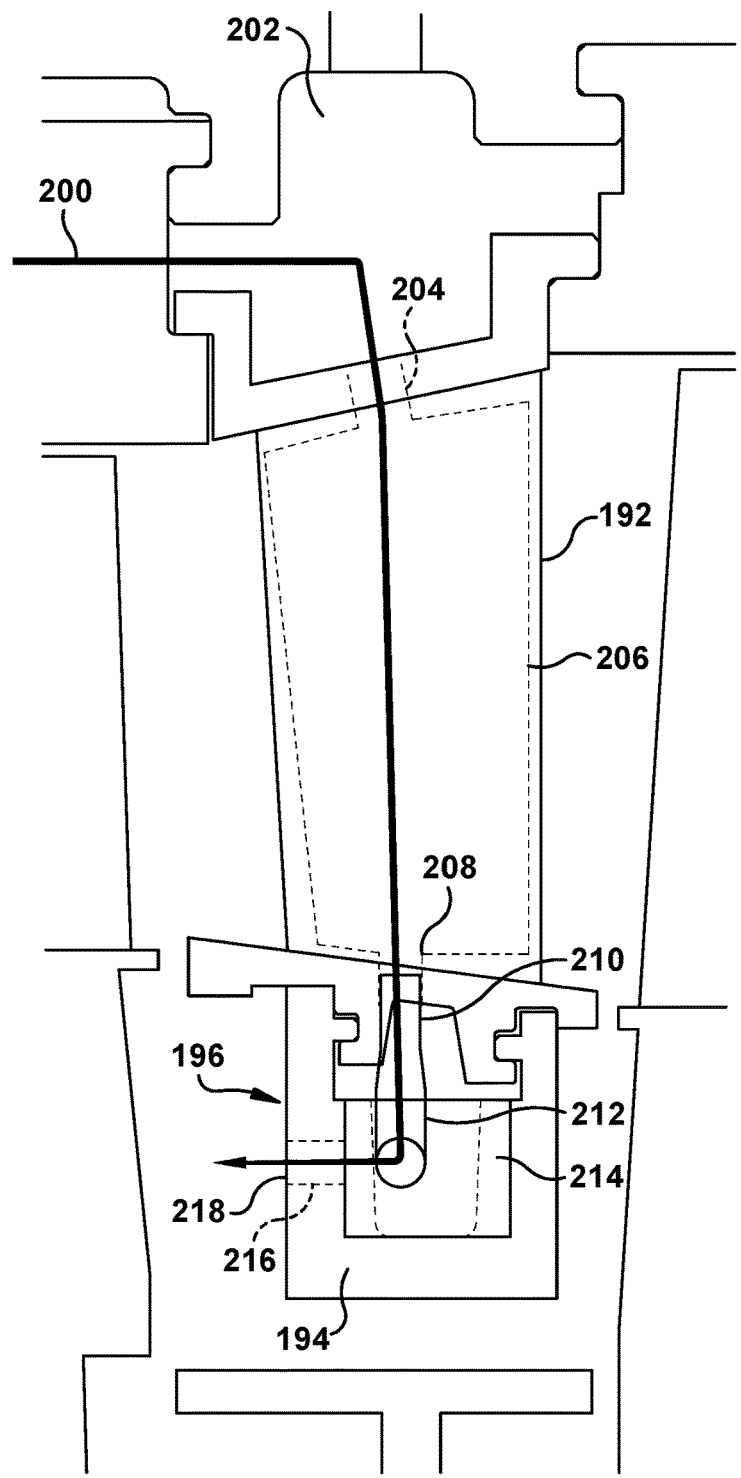
FIG. 2 is a schematic cross sectional view of portion of a turbine including a cooling circuit according to embodiments of the invention disclosed herein.

As shown in FIG. 2, a turbomachine cooling circuit 200 can include a plenum 202 at a radially outer end of vane 192. Plenum 202 can be formed as part of additional portion 132 of compressor discharge casing 130 or additional components can be employed, but in any case plenum 202 can ultimately be in fluid communication with extraction port 120 so as to receive cooling fluid therefrom. Cooling circuit 200 can continue from plenum 202 through an inlet 204 of vane 192 formed at the radially outer end of vane 192, through a cooling passage 206 formed within vane 206 to an exit 208 and/or a purge tube 210 at a radially inner end the vane 192 of stationary component 190, and through one or more exit passages 216 extending to exits 218 at a diametral surface 196 of diaphragm 194, delivering cooling fluid to wheelspaces 195. In embodiments, purge tube 210 can include exit 208 of cooling passage 206. A connector 212 can place purge tube 210 in fluid communication with a mixing chamber 214, which can be formed in a radially outer portion of diaphragm 194. In part to save axial space, two such purge tubes 210 and connectors 212 can be connected to mixing chamber 214, one at either end, extending from vanes 192 mounted at either end of mixing chamber 214 as will be described and shown below.

Figure 3:
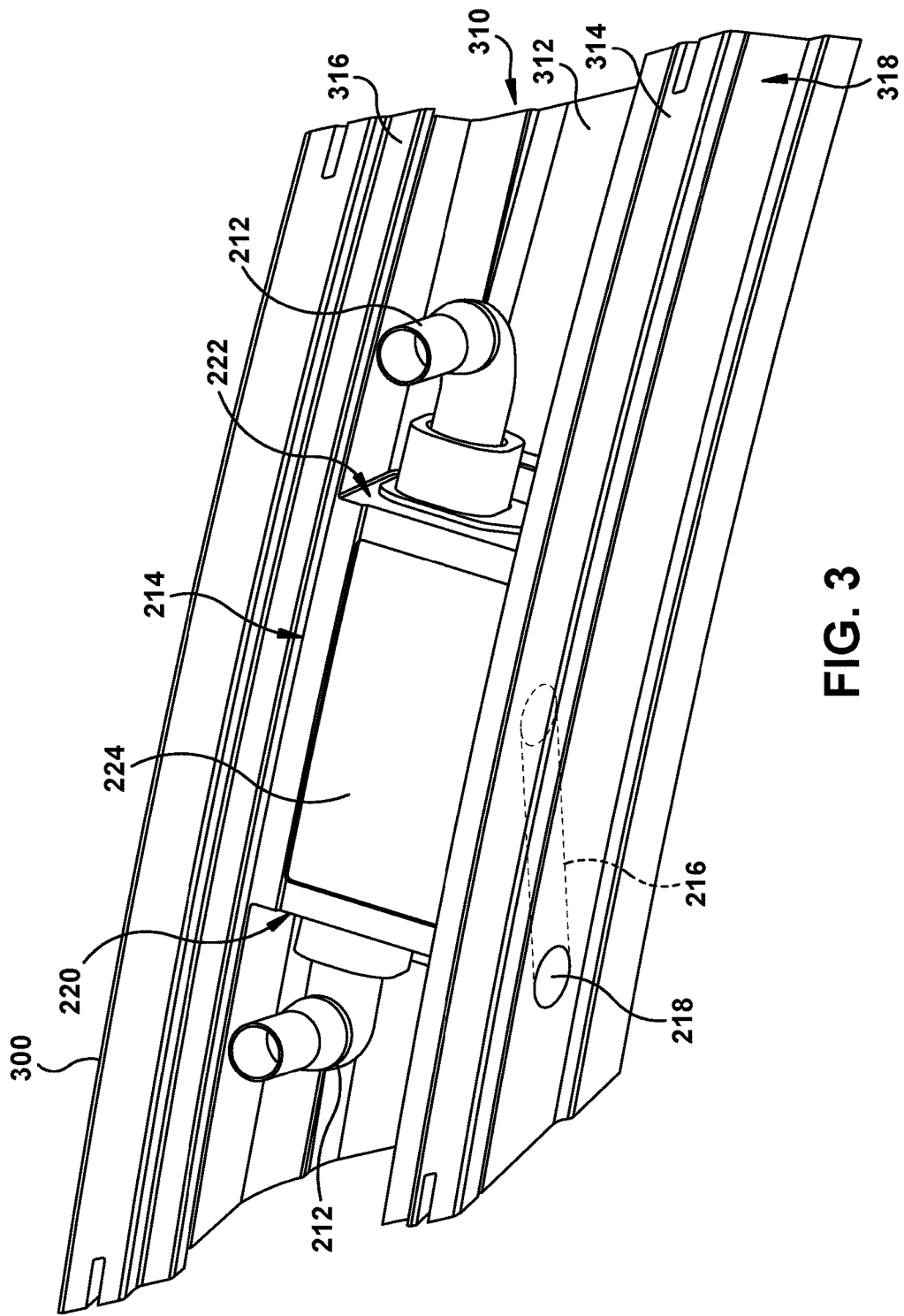
FIG. 3 is a schematic elevation view of a mixing chamber mounted in a portion of a diaphragm according to embodiments of the invention disclosed herein.
Figure 4:
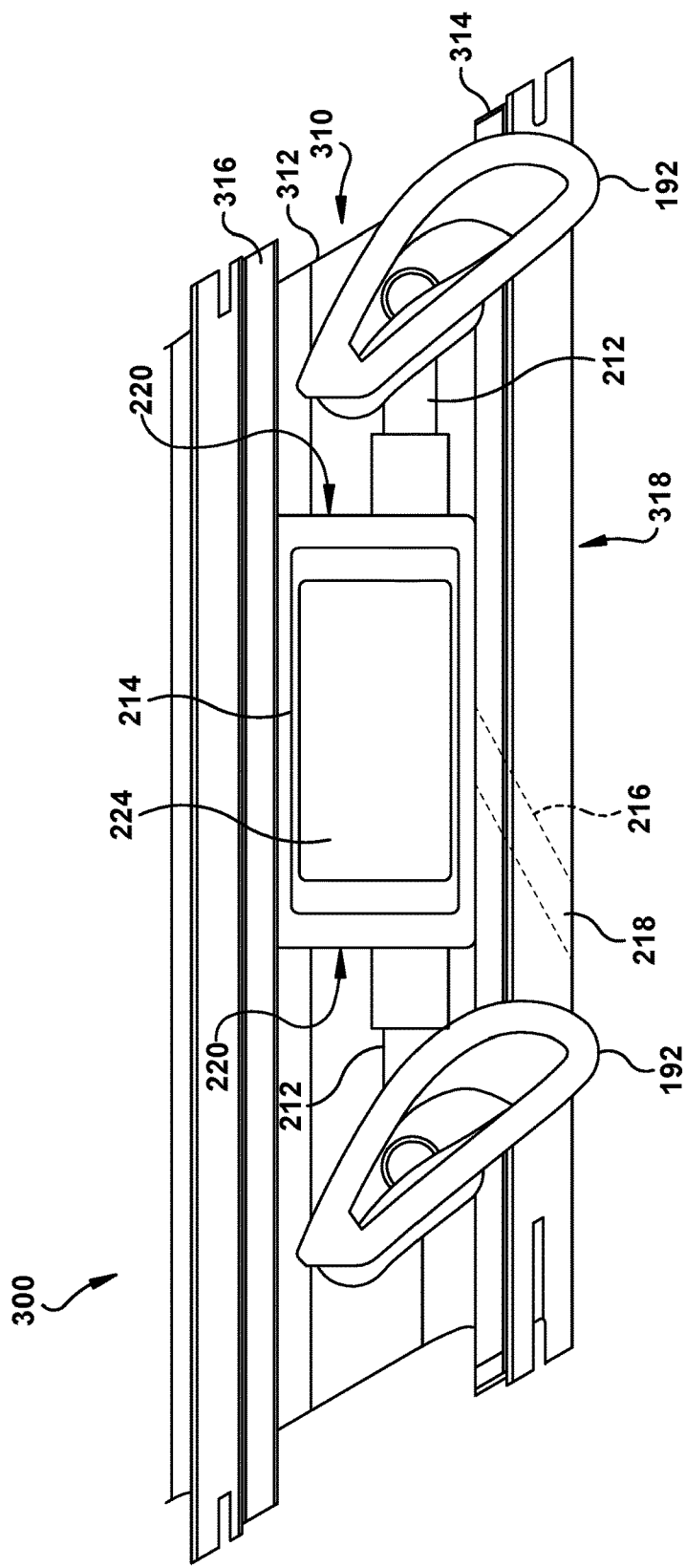
FIG. 4 is a schematic top view of the mixing chamber shown in FIG. 3 and including vanes attached thereto according to embodiments of the invention disclosed herein.
Figure 5:
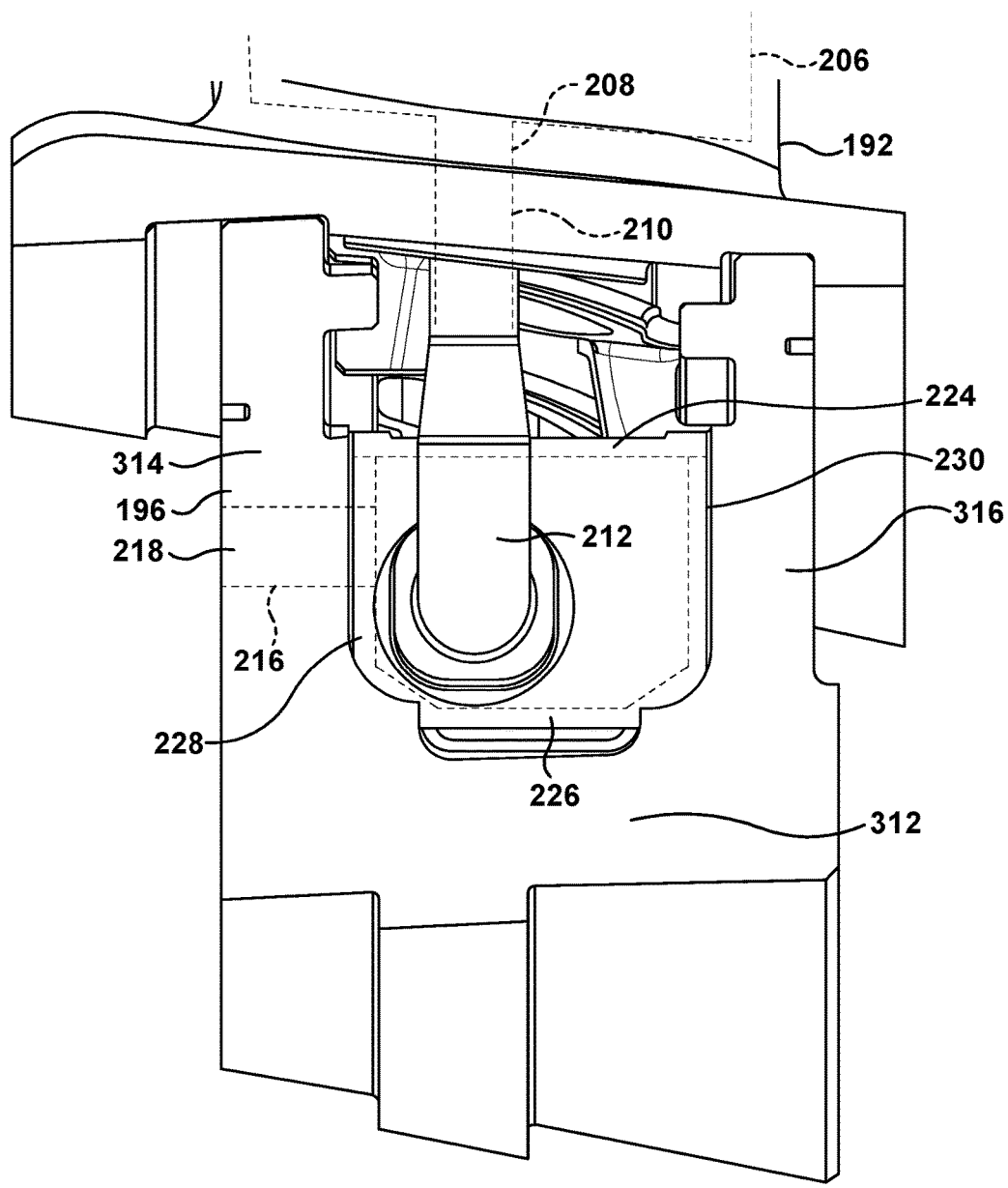
FIG. 5 is a schematic side view of the lower portion of the cooling circuit shown in FIG. 2 showing more detail of the mixing chamber and its connections according to embodiments of the invention disclosed herein.

FIGS. 3-5 show additional details of embodiments of the invention. An example of an arcuate segment 300 of diaphragm 194 is shown in FIGS. 3 and 4 and illustrates that mixing chamber 214 can receive fluid from a set of purge tubes, such as at least a pair of purge tubes or two or more purge tubes, via respective connectors 212 each extending through an end wall of mixing chamber 214. Thus, mixing chamber 214 can include circumferentially spaced apart mixing chamber end walls 220, 222, a mixing chamber top wall 224 radially spaced apart from a mixing chamber bottom wall 226 (FIG. 4), and opposed forward and aft mixing chamber side walls 228, 230. Exit passages 216 can be formed through one or more of mixing chamber side walls 228, 230 and a corresponding portion of diaphragm 194 such that cooling fluid entering mixing chamber 214 from the two purge tubes 210 can flow into mixing chamber 214 and exit through the at least one exit passage 216 to respective exits 218 at and/or in a surface 196 of diaphragm 194 that is substantially parallel to a surface of mixing chamber side wall(s) 228, 230. As can be seen, exit passage(s) 216 can be advantageously inclined with respect to the side walls of mixing chamber 214 and/or diametral surfaces of diaphragm 194 to induce a velocity component in exiting cooling fluid that is substantially parallel to a respective diametral surface of diaphragm(s) 194 and/or in a substantially circumferential direction thereof. Such a velocity component can, for example, be in a direction of rotation of rotating component(s) 185 or opposite such a direction of rotation as may be suitable and/or desired to enhance heat transfer from rotating component(s) 185.

As seen in FIGS. 3 and 4, arcuate segment 300 of diaphragm 194 can include a cavity 310 in which mixing chamber 214 can be formed. Cavity 310 can include a radially inner wall 312 and forward and aft cavity side walls 314, 316. An outer surface 318 of a cavity side wall 314, 316 can be part of diametral surface 196 of diaphragm 194. In addition, cavity 310 can extend along the entirety of arcuate segment 300 so that when a plurality of arcuate segments 300 are assembled to form diaphragm 194, the cavities 310 thereof can form a substantially circumferential groove in a radially outer portion of diaphragm 194. When so assembled, the walls of the arcuate segments combine so that the groove can include opposed forward and aft groove side walls and a substantially circumferential groove inner wall.

In embodiments, as seen in FIG. 5, mixing chamber bottom and opposed side walls 226, 228, 230 can conform to corresponding cavity inner and opposed side walls 312, 314, 316, though in other embodiments mixing chamber bottom and opposed side walls 226, 228, 230 can include cavity inner and opposed side walls 312, 314, 216, respectively, or vice versa. In either case, mixing chamber top wall 224 can extend substantially from forward cavity side wall 314 to aft cavity side wall 316, as well as substantially from forward mixing chamber side wall 228 to aft mixing chamber side wall 230. In addition, mixing chamber end walls 220, 222 can extend from mixing chamber top wall 224 to mixing chamber bottom wall 226 and/or cavity/groove inner wall 312, and from forward mixing chamber side wall 228 and/or forward cavity/groove side wall 314 to aft mixing chamber side wall 230 and/or aft cavity/groove side wall 316.

As also seen, each exit passage 216 can extend through both a mixing chamber side wall 228, 230 and a cavity/groove side wall 314, 316 to exit 218 on surface 196/318, and can be inclined relative to the mixing chamber side wall in which it is formed so as to induce a velocity component to fluid exiting the mixing chamber that is substantially parallel to a surface of the one mixing chamber side wall. It can also be said that each exit passage 216 is inclined relative to the one mixing chamber side wall 228, 230 and the corresponding cavity side wall 314, 316 so as to induce a velocity component to fluid exiting the corresponding cavity side wall 314, 316 that is substantially parallel to a surface of the corresponding cavity side wall 314, 316. It can be advantageous to form exit passage(s) 216 in forward mixing chamber side wall 228 and/or forward cavity side wall 314 to enjoy space conservation and/or heat transfer efficiencies.

Again, the velocity component can be substantially in a direction of rotation of a turbine wheel of the turbomachine in embodiments, though in other embodiments the velocity component can be in a direction opposite to the direction of rotation of a turbine wheel of the turbomachine. As shown in FIGS. 2-4, connector 212 between purge tube 210 and mixing chamber 214 can be formed substantially in a diametral plane of diaphragm 194 and can extend in a substantially circumferential direction of diaphragm 194 through an end wall 220, 222 of mixing chamber 214.

Thus, an example of a turbomachine cooling system is illustrated according to embodiments and can include a cooling fluid extraction port 120 in compressor section 105 of turbomachine 100 through which cooling fluid selectively flows from compressor section 105. A cooling fluid conduit, such as can be formed by additional portion 132 of compressor discharge casing 130, and/or can include a plenum 202, can be in fluid communication with extraction port 120 and cooling passage inlets 204 of a pair of vanes 192 of stationary component 190 in turbine section 180 of turbomachine 100. Vanes 192 can be mounted with radially inner ends substantially adjacent an outer periphery of diaphragm 194, and cavity 310 formed in the outer periphery of diaphragm 194 can include cavity inner wall 312 extending in a substantially circumferential direction of diaphragm 194 and opposed forward and aft cavity side walls 314, 316 extending substantially radially away from cavity inner wall 312. Purge tubes 210 at the radially inner ends of vanes 192 can be in fluid communication with cooling passages 206, as well as with mixing chamber 214 formed in cavity 310. As shown and described, mixing chamber 214 can include opposed mixing chamber end walls 220, 222, mixing chamber top wall 224 radially spaced apart from mixing chamber bottom wall 226, and opposed forward and aft mixing chamber side walls 228, 230. At least one exit passage 216 can extend through one of mixing chamber side walls 228, 230 and through a corresponding one of cavity side walls 314, 316 such that cooling fluid entering mixing chamber 214 from purge tubes 210 through the end walls 220, 222 can flow into mixing chamber 214 and exit through the at least one exit passage 216 to a surface 196 of diaphragm 194.

A plurality of vanes 192 can be mounted and circumferentially spaced around diaphragm 194, and diaphragm 194 can include a plurality of arcuate segments 300 each including a respective mixing chamber 214 connected to a pair of purge tubes 210 of a respective pair of vanes 192 mounted on the respective arcuate segment 300. As shown in the example of the FIGS., each arcuate segment 300 can include two vanes 192 connected to the respective mixing chamber 214 in a respective cavity 310 of the arcuate segment 300. In embodiments, the cavities 310 of assembled arcuate segments 300 can form a substantially circumferential groove around diaphragm 194, each arcuate segment 300 thus including a portion of the substantially circumferential groove. In addition, each arcuate segment 300 can include two vanes 192, one on either end of mixing chamber 214, such that the respective purge tubes 210 are disposed at either end of mixing chamber 214.

Embodiments can thus take the form of a turbomachine 100 comprising a compressor section 105 including a cooling fluid extraction port 120 through which cooling fluid selectively flows from compressor section 105, and a turbine section 180 including a plurality of stationary components 190 and a plurality of rotating components 185. At least one stationary component 190 can a diaphragm 194 having a cavity 310 formed in an outer portion thereof, cavity 310 having a substantially circumferential cavity inner wall 312 and opposed forward and aft cavity side walls 314, 316 extending substantially radially away from cavity inner wall 312, and a plurality of vanes 192 extending radially away from diaphragm 194. Each rotating component 185 can include a turbine wheel. A cooling fluid circuit 200 can be in fluid communication with extraction port 120 and can include a cooling passage 206 of each vane 192 extending from a cooling passage inlet 204 in fluid communication with extraction port 120 to a cooling passage exit 208 at a radially inner end of the respective vane 192, a purge tube 210 of each vane 192 at a radially inner end thereof and in fluid communication with cooling passage exit 208, and a mixing chamber 214 formed in cavity 310 in fluid communication with a pair of vanes 192. Mixing chamber 314 can include circumferentially spaced apart mixing chamber end walls 220, 222, a mixing chamber top wall 224 radially spaced apart from a mixing chamber bottom wall 226, and opposed forward and aft mixing chamber side walls 228, 230. Cooling circuit 200 can additionally include respective connectors 212 extending from each purge tube 210 of the pair of vanes 192 to a respective end wall 220, 222 of mixing chamber 214, each connector 212 providing fluid communication between the respective purge tube 210 and mixing chamber 214 through the respective end wall 220, 222. Cooling circuit 200 can further include at least one exit passage 216 formed through one of the mixing chamber side walls 228, 230 and the corresponding cavity side wall 314, 316 and can be inclined relative thereto such that cooling fluid entering mixing chamber 214 from purge tubes 210 can flow into mixing chamber 214 and can exit through the at least one exit passage 216 at a surface 196 of diaphragm 194 with a velocity component substantially parallel to the surface 196 of diaphragm 194. Diaphragm 194 can include a plurality of mixing chambers 214 connected to respective pairs of vanes 192 mounted on diaphragm 194. In addition, diaphragm 194 can include a plurality of arcuate segments 300, each cavity 310 thereof can be a portion of a substantially circumferential groove of diaphragm 194, and each arcuate segment 300 can include a respective mixing chamber 314 in fluid communication with the respective purge tubes 210 of a respective pair of vanes 192 mounted on either end of mixing chamber 214.

As suggested above, mixing chamber bottom and side walls 226, 228, 230 can include cavity inner and side walls 312, 314, 316, respectively, mixing chamber top wall 224 can extend from forward cavity side wall 314 to aft cavity side wall 316, and opposed mixing chamber end walls 220, 222 can extend from forward cavity side wall 314 to aft cavity side wall 316 and from cavity inner wall 312 to mixing chamber top wall 224. Connectors 212 can be formed substantially in a diametral plane of diaphragm 194 and extend in a substantially circumferential direction of diaphragm 194 through the respective end wall 220, 222 of mixing chamber 214.

Employing embodiments of the invention as disclosed herein, a more compact gas turbine can be formed that can still have efficient heat transfer from a turbine wheel disposed forward of a diaphragm from which cooling fluid is distributed. By inclining an exit passage from the diaphragm, a velocity component can be induced on the cooling fluid, such as with rotation of the turbine wheel, to enhance heat transfer and/or flow properties. An axial space savings on the order of 25% can be enjoyed, allowing four turbine stages to be implemented in the space formerly occupied by three turbine stages.

In addition, for example, there can be a significant benefit to configuring the jets of air entering the mixing chamber from the purge tubes purposely misaligned. If the jets are aligned, there can be more pressure loss due to mixing, resulting in a less efficient design. If the jets are misaligned, the mixing loss can be reduced. This can be done by offsetting the purge tubes in the radial and/or axial directions or by orienting them at different angles relative to the diameter or circumference of the engine.

Furthermore, if the jets are offset in a certain way it can create a swirling flow pattern in the mixing chamber that will more readily feed air through the hole(s) exiting to the wheel space. This can decrease pressure losses and allow for a more efficient design. For example, with reference to FIG. 4, if the left tube 212 is slanted up (aft) and the right tube 212 is slanted down (forward), a clockwise swirling flow can be established that can more easily enter exit hole 218.

Embodiments of the invention disclosed herein have been described in terms of at least one exit passage extending through at least one side wall of a mixing chamber and/or a diaphragm. While using exit passage(s) through side wall(s) can be particularly advantageous, exit passage(s) can also extend through the bottom wall of the mixing chamber and the inner wall of the diaphragm in embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A turbomachine cooling system in a turbomachine that has a work fluid path, a stationary component including a diaphragm located out of the work fluid path, the stationary component having mounted thereon a plurality of vanes extending into the work fluid path, the diaphragm including in its outer periphery a circumferential groove with a forward groove side wall, an aft groove side wall, and a groove bottom wall, the turbomachine cooling system comprising:
   a cooling fluid extraction port in a compressor section of the turbomachine;
   a cooling fluid conduit in fluid communication with the cooling fluid extraction port and a respective cooling passage inlet of each of the vanes of the plurality of vanes, the vanes each including a cooling passage extending radially inwardly from the cooling passage inlet to a radially inner end of the respective vane;
   a respective purge tube at the radially inner end of each vane and in fluid communication with the respective cooling passage and extending into the circumferential groove;
   a plurality of mixing chambers disposed in the circumferential groove each in fluid communication with the purge tubes of the at least two vanes, each mixing chamber including a mixing chamber bottom wall in the circumferential groove, opposed mixing chamber end walls circumferentially spaced apart in the circumferential groove and connected to the mixing chamber bottom wall, a mixing chamber top wall radially spaced apart from the mixing chamber bottom wall, a forward mixing chamber side wall connected to the mixing chamber bottom wall, an aft mixing chamber side wall, and a mixing chamber inlet in one of the mixing chamber end walls providing the fluid communication with the purge tube; and
   each mixing chamber having a single exit passage, the single exit passage extending through the forward mixing chamber side wall and through the forward groove side wall such that cooling fluid entering the mixing chamber from the respective purge tubes through the mixing chamber end walls flows into the mixing chamber and exits through the single exit passage to a forward surface of the diaphragm, the respective purge tubes of the respective at least two vanes thereby feeding a single mixing chamber.

2. The turbomachine cooling system of claim 1, wherein the diaphragm includes a plurality of arcuate segments each including a respective mixing chamber connected to at least two respective purge tubes of respective vanes mounted on the arcuate segment.

3. The turbomachine cooling system of claim 2, wherein each arcuate segment includes two respective nozzle vanes mounted on either end of the respective mixing chamber.

4. The turbomachine cooling system of claim 2, wherein each arcuate segment of the plurality of arcuate segments includes a respective portion of the circumferential groove around the diaphragm.

5. The turbomachine cooling system of claim 1, further comprising a respective connector between each purge tube and its respective mixing chamber end wall that is formed in a diametral plane of the diaphragm and extends in a circumferential direction of the diaphragm through the respective mixing chamber end wall.

6. A turbomachine comprising:
a compressor section including a cooling fluid extraction port;
a turbine section including a plurality of stationary components and a plurality of rotating components, at least one stationary component including:
a diaphragm having a circumferential groove in an outer periphery of the diaphragm and having an inner wall, a forward groove side wall, and an aft groove side wall, the forward groove side wall and the aft groove side wall extending radially away from the groove inner wall; and
a plurality of vanes extending radially away from the diaphragm;
each rotating component of the plurality of rotating components including a turbine wheel; and
a cooling fluid circuit in fluid communication with the cooling fluid extraction port and including:
a cooling passage of each vane of the plurality of vanes extending from a cooling passage inlet in fluid communication with the cooling fluid extraction port to a cooling passage exit at a radially inner end of the respective vane;
a purge tube at a radially inner end of each vane of the plurality of vanes and in fluid communication with the cooling passage exit;
a mixing chamber disposed in the circumferential groove in fluid communication with at least a pair of the plurality of vanes, the mixing chamber including circumferentially spaced apart mixing chamber end walls, a mixing chamber top wall radially spaced apart from a mixing chamber bottom wall, a forward mixing chamber side wall, and an aft mixing chamber side wall, the mixing chamber bottom wall conforming to the circumferential groove inner wall, the mixing chamber top wall and the mixing chamber bottom wall being connected to the mixing chamber end walls, the forward mixing chamber side wall, and the aft mixing chamber side wall;
respective connectors extending from each purge tube of the at least a pair of the plurality of vanes to a respective mixing chamber end wall, each connector providing fluid communication between the respective purge tube and the mixing chamber through the respective mixing chamber end wall; and
the mixing chamber having a single exit passage, the single exit passage being formed through and inclined relative to the forward mixing chamber side wall and the forward groove side wall such that cooling fluid entering the mixing chamber from the purge tubes flows into the mixing chamber and exits through the single exit passage at a surface of the diaphragm with a velocity component parallel to a surface of the diaphragm.

7. The turbomachine of claim 6, wherein the diaphragm includes a plurality of mixing chambers each connected to respective pairs of vanes mounted on the diaphragm.

8. The turbomachine of claim 7, wherein the diaphragm includes a plurality of arcuate segments, and each arcuate segment includes a respective mixing chamber in fluid communication with the respective purge tubes of the respective pair of vanes mounted on either end of the mixing chamber.

9. The turbomachine of claim 6, wherein the connectors are formed in a diametral plane of the diaphragm and extend in a circumferential direction of the diaphragm through their respective mixing chamber end walls.

10. A turbomachine cooling circuit in a turbomachine that has a work fluid path, a stationary component including a diaphragm located out of the work fluid path, the stationary component having mounted thereon a plurality of vanes extending into the work fluid path, the diaphragm including in its outer periphery a circumferential groove with a forward groove side wall, an aft groove side wall, and a groove bottom wall, the turbomachine cooling circuit comprising:
a cooling passage extending from a radially outer end of each vane of the plurality of vanes to a radially inner end of each respective vane, the cooling passage being in fluid communication with a cooling fluid supply;
a purge tube extending from the radially inner end of each vane into the circumferential groove;
a plurality of mixing chambers circumferentially spaced apart in the circumferential groove, each mixing chamber being in fluid communication with at least two respective purge tubes, each mixing chamber including a mixing chamber bottom wall, two mixing chamber end walls circumferentially spaced apart in the circumferential groove and connected to the mixing chamber bottom wall, a forward mixing chamber side wall connected to the mixing chamber bottom wall, an aft mixing chamber side wall connected to the mixing chamber bottom wall, and a mixing chamber top wall connecting the mixing chamber end walls, the forward mixing chamber side wall, and the aft mixing chamber side wall, each mixing chamber thus being formed by the respective mixing chamber top wall, mixing chamber end walls, the forward mixing chamber side wall, the aft mixing chamber side wall, and the mixing chamber bottom wall; and
a single respective exit passage in fluid communication with each mixing chamber, each single respective exit passage extending from the respective mixing chamber through the forward groove side wall and out a respective exit hole in a forward diametral surface of the diaphragm to a space forward of the diaphragm so that in operation cooling fluid from the cooling fluid supply travels through each vane cooling passage to and through the respective purge tube, then to and through the plurality of mixing chambers via at least two respective purge tubes per mixing chamber, and on through the single respective exit passage of each mixing chamber through the forward diametral surface of the diaphragm.

11. The turbomachine cooling circuit of claim 10, wherein the mixing chamber bottom wall, the forward mixing chamber side wall, and the aft mixing chamber side wall of each mixing chamber conform to the groove bottom wall, the forward groove side wall, and the aft groove side wall, respectively.

12. The turbomachine cooling circuit of claim 10, wherein each purge tube is fluidly connected to its respective mixing chamber via a connector disposed in a diametral plane of the diaphragm and a portion of the connector extending in a circumferential direction of the diaphragm through one of the respective mixing chamber end walls.

13. The turbomachine cooling circuit of claim 12, wherein each mixing chamber end wall of each mixing chamber receives a respective connector from a respective purge tube.

\* \* \* \* \*